US010884650B1

(12) United States Patent
Meiri et al.

(10) Patent No.: US 10,884,650 B1
(45) Date of Patent: Jan. 5, 2021

(54) OPPORTUNISTIC COMPRESSION OF REPLICATED DATA IN A CONTENT ADDRESSABLE STORAGE SYSTEM

(71) Applicant: EMC IP Holding Company LLC, Hopkinton, MA (US)

(72) Inventors: David Meiri, Somerville, MA (US); William Stronge, Westford, MA (US)

(73) Assignee: EMC IP Holding Company LLC, Hopkinton, MA (US)

(*) Notice: Subject to any disclaimer, the term of this patent is extended or adjusted under 35 U.S.C. 154(b) by 262 days.

(21) Appl. No.: 15/793,121

(22) Filed: Oct. 25, 2017

(51) Int. Cl.
*G06F 3/06* (2006.01)

(52) U.S. Cl.
CPC ............ *G06F 3/065* (2013.01); *G06F 3/067* (2013.01); *G06F 3/0619* (2013.01); *G06F 3/0689* (2013.01)

(58) Field of Classification Search
CPC ............................ G06F 3/065; G06F 3/0619
See application file for complete search history.

(56) References Cited

U.S. PATENT DOCUMENTS

| | | |
|---|---|---|
| 7,165,155 B1 | 1/2007 | Duprey et al. |
| 7,440,982 B2 * | 10/2008 | Lu ................. G06F 11/1448 |
| 7,444,464 B2 | 10/2008 | Urmston et al. |
| 8,095,726 B1 | 1/2012 | O'Connell et al. |
| 8,214,612 B1 | 7/2012 | Natanzon |
| 8,301,593 B2 | 10/2012 | Hoffmann et al. |
| 8,335,899 B1 | 12/2012 | Meiri et al. |
| 9,104,326 B2 | 8/2015 | Frank et al. |
| 9,208,162 B1 | 12/2015 | Hallak et al. |

(Continued)

FOREIGN PATENT DOCUMENTS

| | | |
|---|---|---|
| WO | 2016111954 A1 | 7/2016 |
| WO | PCT/US2019/024885 | 1/2020 |
| WO | PCT/US2019/024900 | 1/2020 |

OTHER PUBLICATIONS

EMC Corporation, "Introduction to the EMC XtremIO Storage Array (Ver. 4.0): A Detailed Review," White Paper, Apr. 2015, 65 pages.

(Continued)

*Primary Examiner* — David Yi
*Assistant Examiner* — Nicholas A. Paperno
(74) *Attorney, Agent, or Firm* — Ryan, Mason & Lewis, LLP

(57) ABSTRACT

An apparatus in one embodiment comprises a first storage system having a plurality of storage devices. The first storage system is configured to participate in a replication process with a second storage system. The first storage system comprises a replication engine configured to request from a data module of the first storage system at least one data page to be replicated to the second storage system as part of the replication process. If the requested data page is already available in compressed form in the data module, the replication engine receives the requested data page in compressed form and transmits it to the second storage system along with at least a portion of a content-based signature of the requested data page. If the requested data page is not already available in compressed form in the data module, the replication engine receives the requested data page in uncompressed form and transmits it to the second storage system.

20 Claims, 8 Drawing Sheets

(56) References Cited

U.S. PATENT DOCUMENTS

| | | | |
|---|---|---|---|
| 9,286,003 | B1 | 3/2016 | Hallak et al. |
| 9,514,014 | B2 | 12/2016 | Webman et al. |
| 9,552,258 | B2 | 1/2017 | Hallak et al. |
| 9,606,870 | B1 | 3/2017 | Meiri et al. |
| 9,716,754 | B2 | 7/2017 | Swift |
| 9,891,994 | B1 | 2/2018 | Schneider et al. |
| 10,176,046 | B1 | 1/2019 | Hu et al. |
| 10,261,693 | B1 | 4/2019 | Schneider et al. |
| 10,324,640 | B1 | 6/2019 | Chen et al. |
| 10,338,851 | B1 | 7/2019 | Kronrod et al. |
| 10,359,965 | B1 | 7/2019 | Stronge et al. |
| 10,394,485 | B1 | 8/2019 | Chen et al. |
| 10,437,501 | B1 | 10/2019 | Kucherov et al. |
| 10,437,855 | B1 | 10/2019 | Stronge et al. |
| 10,466,925 | B1 | 11/2019 | Blanco et al. |
| 10,496,324 | B2 | 12/2019 | Meiri et al. |
| 10,496,489 | B1 | 12/2019 | Chen et al. |
| 10,496,672 | B2 | 12/2019 | Meiri et al. |
| 10,558,613 | B1 | 2/2020 | Shveidel et al. |
| 10,592,159 | B2 | 3/2020 | Kucherov et al. |
| 10,592,161 | B1 | 3/2020 | Chen et al. |
| 10,606,519 | B1 | 3/2020 | Shveidel |
| 2007/0022121 | A1 | 1/2007 | Bahar et al. |
| 2008/0279462 | A1 | 11/2008 | Celi, Jr. |
| 2009/0132955 | A1 | 5/2009 | Garg et al. |
| 2009/0276593 | A1 | 11/2009 | Jacobson et al. |
| 2010/0179941 | A1 | 7/2010 | Agrawal et al. |
| 2011/0022566 | A1* | 1/2011 | Beaverson ............ G06F 16/137 707/639 |
| 2011/0225123 | A1* | 9/2011 | D'Souza ............. H04L 67/1095 707/634 |
| 2012/0124282 | A1 | 5/2012 | Frank et al. |
| 2013/0305002 | A1 | 11/2013 | Hallak et al. |
| 2013/0325824 | A1 | 12/2013 | Shoens |
| 2014/0181016 | A1 | 6/2014 | Whitehead et al. |
| 2014/0244935 | A1 | 8/2014 | Ezra et al. |
| 2015/0378766 | A1* | 12/2015 | Beveridge ............ G06F 16/273 718/1 |
| 2015/0378785 | A1 | 12/2015 | Tarasuk-Levin et al. |
| 2016/0150012 | A1 | 5/2016 | Barszczak et al. |
| 2016/0170987 | A1 | 6/2016 | Kesselman |
| 2016/0202927 | A1 | 7/2016 | Klarakis et al. |
| 2016/0224259 | A1 | 8/2016 | Ahrens et al. |
| 2016/0261513 | A1 | 9/2016 | Aingaran et al. |
| 2016/0345207 | A1 | 11/2016 | Kwak et al. |
| 2017/0075842 | A1 | 3/2017 | Su et al. |
| 2017/0185529 | A1* | 6/2017 | Chhabra ............... G06F 3/0685 |
| 2017/0192857 | A1 | 7/2017 | Meiri et al. |
| 2018/0095873 | A1* | 4/2018 | Nakagoe ................ G06F 12/16 |
| 2019/0303490 | A1 | 10/2019 | Chen et al. |
| 2019/0392060 | A1 | 12/2019 | Meiri et al. |
| 2020/0026616 | A1 | 1/2020 | Hu et al. |
| 2020/0097174 | A1 | 3/2020 | Moore et al. |
| 2020/0097363 | A1 | 3/2020 | Moore et al. |
| 2020/0097393 | A1 | 3/2020 | Moore et al. |

OTHER PUBLICATIONS

EMC Corporation, "Unstoppable Data Reduction: Always-on, In-Line, Zero-Penalty, Enterprise-Class, Free,"https://store.emc.com/xtremio, Jul. 2014, 2 pages.

EMC Corporation, "Introduction to XtremIO Virtual Copies," White Paper, Mar. 2016, 39 pages.

EMC Corporation, "XtremIO Data Production (XDP): Flash-Specific Data Protection, Provided by XtremIO (Ver. 4.0)," White Paper, Apr. 2015, 25 pages.

Dell EMC, "XtremIO v6.0 Specifications," Specification Sheet, 2017, 4 pages.

Dell EMC, "Dell EMC XtremIO X2: Next-Generation All-Flash Array," Data Sheet, 2017, 5 pages.

Itzikr, "DellEMC XtremIO X2/X1 Management, Part 1, The CAS Architecture = Simplicity?," https://xtremio.me/2017/05/08/dellemc-xtremio-x2x1-management-part-1-the-cas-architecture-simplicity/, May 8, 2017, 6 pages.

EMC Corporation, "High Availability, Data Protection and Data Integrity in the XtremIO Architecture," White Paper, Apr. 2015, 28 pages.

Itzikr, "DellEMC XtremIO X2 Tech Preview #2—Native Replication," https://xtremio.me/2017/05/09/dellemc-xtremio-x2-tech-preview-2-native-replication/, May 9, 2017, 8 pages.

Y. Zhang et al., "End-to-End Integrity for File Systems: A ZFS Case Study," Proceedings of the 8th USENIX Conference on File and Storage Technologies (FAST), Feb. 23-26, 2010, 14 pages.

Dell EMC, "Introduction to Dell EMC XtremIO X2 Storage Array—A Detailed Review," Dell EMC White Paper, Aug. 2017, 46 pages.

N. Tolia et al., "Opportunistic Use of Content Addressable Storage for Distributed File Systems," Proceedings of the USENIX Annual Technical Conference, Jun. 9-14, 2003, 14 pages.

U.S. Appl. No. 15/662,708 filed in the name of Xianping Chen et al. filed Jul. 28, 2017 and entitled "Token-Based Data Flow Control in a Clustered Storage System."

U.S. Appl. No. 15/662,809 filed in the name of William Stronge et al. filed Jul. 28, 2017 and entitled "Automatic Verification of Asynchronously Replicated Data."

U.S. Appl. No. 15/662,833 filed in the name of William Stronge et al. filed Jul. 28, 2017 and entitled "Signature Generated for Use in Comparing Sets of Data in a Content Addressable Storage System."

EMC Corporation, "EMC Recoverpoint Replication of XtremIO: Understanding the Essentials of RecoverPoint Snap-Based Replication for XtremIO," EMC White Paper, Aug. 2015, 31 pages.

Dell EMC, "Introduction to Dell EMC XtremIO X2 Storage Array—A Detailed Review," Dell EMC White Paper, Apr. 2018, 52 pages.

Dell EMC, "Introduction to XtremIO Metadata-Aware Replication," Dell EMC White Paper, Apr. 2018, 18 pages.

Dell EMC, "PowerMax OS," Dell EMC PowerMax Family Product Guide, May 2019, 192 pages.

Dell EMC, "Dell EMC VxRack FLEX," Dell EMC Product Overview, 2018, 5 pages.

U.S. Appl. No. 15/824,536 filed in the name of Christopher Sayles et al. filed Nov. 28, 2017, and entitled "Storage System with Asynchronous Messaging between Processing Modules for Data Replication."

U.S. Appl. No. 16/166,397 filed in the name of Nimrod Shani et al. filed Oct. 22, 2018, and entitled "Storage System with Data Integrity Verification Performed in Conjunction with Internal Data Movement."

U.S. Appl. No. 16/253,793 filed in the name of Yuval Harduf et al. filed Jan. 22, 2019, and entitled "Storage System with Data Consistency Checking in Synchronous Replication Using Active Snapshot Set."

U.S. Appl. No. 16/265,131 filed in the name of Lior Kamran et al. filed Feb. 1, 2019, and entitled "Storage System with Write Cache Release Protection."

U.S. Appl. No. 16/343,949 filed in the name of Asaf Porath et al. filed Apr. 22, 2019, and entitled "Snapshot-Enabled Storage System Implementing Algorithm for Efficient Reading of Data from Stored Snapshots."

U.S. Appl. No. 16/343,942 filed in the name of Yonatan Shtarkman et al. filed Apr. 22, 2019, and entitled "Snapshot-Enabled Storage System Implementing Algorithm for Efficient Reclamation of Snapshot Storage Space."

U.S. Appl. No. 16/396,897 filed in the name of Anton Kucherov et al. filed Apr. 29, 2019, and entitled "Storage System with Deduplication-Aware Replication Implemented Using a Standard Storage Command Protocol."

U.S. Appl. No. 16/413,050 filed in the name of Xiangping Chen et al. filed May 15, 2019, and entitled "Storage System with Coordinated Recovery across Multiple Input-Output Journals of Different Types."

U.S. Appl. No. 16/530,121 filed in the name of Anton Kucherov et al. filed Aug. 2, 2019, and entitled "Memory-Efficient Processing of Raid Metadata Bitmaps."

U.S. Appl. No. 16/663,524 filed in the name of Xiangping Chen et al. filed Oct. 25, 2019, and entitled "Storage System with Throughput-Based Timing of Synchronous Replication Recovery."

(56) References Cited

OTHER PUBLICATIONS

U.S. Appl. No. 16/665,651 filed in the name of Lior Kamran et al. filed Oct. 28 2019, and entitled "Recovery Flow with Reduced Address Lock Contention in a Content Addressable Storage System."

U.S. Appl. No. 16/671,824 filed in the name of Lior Kamran et al. filed Nov. 1, 2019, and entitled "Storage System Capacity Expansion Using Mixed-Capacity Storage Devices."

U.S. Appl. No. 16/693,858 filed in the name of Doron Tal filed Nov. 25, 2019, and entitled "Storage System with Prioritized RAID Rebuild."

* cited by examiner

OPPORTUNISTIC COMPRESSION OF REPLICATED DATA IN A CONTENT ADDRESSABLE STORAGE SYSTEM

FIELD

The field relates generally to information processing systems, and more particularly to storage in information processing systems.

BACKGROUND

Many information processing systems are configured to replicate data from a storage system at one site to a storage system at another site. In some cases, such arrangements are utilized to support disaster recovery functionality within the information processing system. For example, an enterprise may replicate data from a production data center to a disaster recovery data center. In the event of a disaster at the production site, applications can be started at the disaster recovery site using the data that has been replicated to that site so that the enterprise can continue its business. Data replication in these and other contexts can be implemented using asynchronous replication. For example, asynchronous replication may be configured to periodically transfer data in multiple cycles from a source site to a target site. Conventional approaches to data replication are problematic in that under certain circumstances, a given replication process can consume excessive amounts of bandwidth on network connections between the source and target sites, and additionally or alternatively can consume excessive computational resources on at least one of the source site and the target site, thereby undermining the efficiency of the replication process. This can in turn make it difficult to achieve a desired recover point objective within the information processing system.

SUMMARY

Illustrative embodiments provide opportunistic compression of replicated data in information processing systems. Such embodiments can advantageously provide significantly improved efficiency in asynchronous replication and other types of data replication processes carried out between a source site and a target site of a given information processing system. For example, these embodiments can reduce consumption of network bandwidth and computational resources, and are therefore better able to achieve desired recover point objectives within the information processing system.

In one embodiment, an apparatus comprises a first storage system comprising a plurality of storage devices. The first storage system is configured to participate in a replication process with a second storage system. The first storage system comprises a replication engine configured to request from a data module of the first storage system at least one data page to be replicated to the second storage system as part of the replication process. Responsive to the requested data page being already available in compressed form in the data module, the replication engine of the first storage system receives from the data module the requested data page in compressed form with a compressed data indicator and transmits the requested data page in compressed form to the second storage system along with at least a portion of a content-based signature of the requested data page. Responsive to the requested data page not being already available in compressed form in the data module, the replication engine of the first storage system receives from the data module the requested data page in uncompressed form with an uncompressed data indicator and transmits the requested data page in uncompressed form to the second storage system.

The replication engine may comprise replication control logic implemented in a storage controller of the first storage system.

Additional functionality implemented in some embodiments relates to efficient performance of end-to-end tests on replicated data.

For example, responsive to the requested data page being already available in compressed form in the data module, the replication engine of the first storage system may be further configured to transmit the requested data page in compressed form to the second storage system while bypassing performance of an end-to-end test on the requested data page that would otherwise normally be performed in the first storage system as part of the replication process.

As another example, responsive to the requested data page not being already available in compressed form in the data module, the replication engine of the first storage system may be further configured to transmit the requested data page in uncompressed form to the second storage system subsequent to performing an end-to-end test on the requested data page as part of the replication process.

The first and second storage systems illustratively comprise respective content addressable storage systems having respective sets of non-volatile memory storage devices. For example, the storage devices of the first and second storage systems in such embodiments can be configured to collectively provide respective all-flash storage arrays.

The first and second storage systems are illustratively associated with respective source and target sites of the replication process. For example, the source site may comprise a production site data center and the target site may comprise a disaster recovery site data center.

Additionally or alternatively, one or both of the first and second storage systems may each comprise a clustered storage system having a plurality of storage nodes each having a plurality of storage devices. For example, a given storage system may be implemented in a distributed manner so as to comprise a plurality of distributed storage system components implemented on respective ones of the storage nodes of the clustered storage system. Numerous other storage system arrangements are possible in other embodiments.

These and other illustrative embodiments include, without limitation, apparatus, systems, methods and processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources. Numerous other types of enterprise computing and storage systems are also encompassed by the term "information processing system" as that term is broadly used herein.

Figure 1:
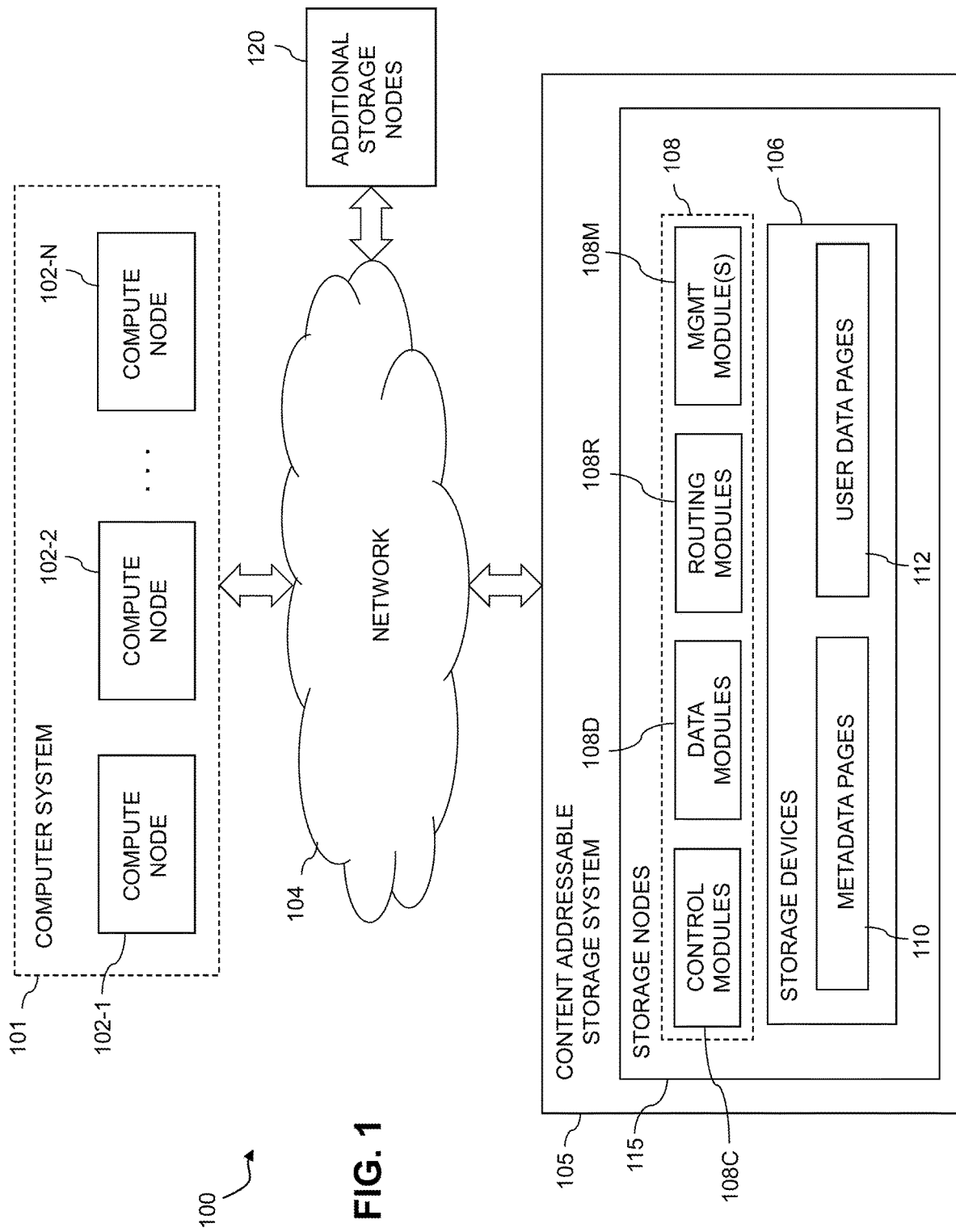
FIG. 1 is a block diagram of an information processing system comprising a content addressable storage system configured for opportunistic compression of replicated data in an illustrative embodiment.

FIG. 1 shows an information processing system 100 configured in accordance with an illustrative embodiment. The information processing system 100 comprises a computer system 101 that includes compute nodes 102-1, 102-2, . . . 102-N. The compute nodes 102 communicate over a network 104 with a content addressable storage system 105. The computer system 101 is assumed to comprise an enterprise computer system or other arrangement of multiple compute nodes associated with respective users.

The compute nodes 102 illustratively comprise respective processing devices of one or more processing platforms. For example, the compute nodes 102 can comprise respective virtual machines (VMs) each having a processor and a memory, although numerous other configurations are possible.

The compute nodes 102 can additionally or alternatively be part of cloud infrastructure such as an Amazon Web Services (AWS) system. Other examples of cloud-based systems that can be used to provide compute nodes 102 and possibly other portions of system 100 include Google Cloud Platform (GCP) and Microsoft Azure.

The compute nodes 102 in some embodiments illustratively provide compute services such as execution of one or more applications on behalf of each of one or more users associated with respective ones of the compute nodes 102.

The term "user" herein is intended to be broadly construed so as to encompass numerous arrangements of human, hardware, software or firmware entities, as well as combinations of such entities. Compute and/or storage services may be provided for users under a platform-as-a-service (PaaS) model, although it is to be appreciated that numerous other cloud infrastructure arrangements could be used. Also, illustrative embodiments can be implemented outside of the cloud infrastructure context, as in the case of a stand-alone enterprise-based computing and storage system.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The content addressable storage system 105 is accessible to the compute nodes 102 of the computer system 101 over the network 104. The content addressable storage system 105 comprises a plurality of storage devices 106 and an associated storage controller 108. The storage devices 106 are configured to store metadata pages 110 and user data pages 112, and may also store additional information not explicitly shown such as checkpoints and write journals. The metadata pages 110 and the user data pages 112 are illustratively stored in respective designated metadata and user data areas of the storage devices 106. Accordingly, metadata pages 110 and user data pages 112 may be viewed as corresponding to respective designated metadata and user data areas of the storage devices 106.

A given "page" as the term is broadly used herein should not be viewed as being limited to any particular range of fixed sizes. In some embodiments, a page size of 8 kilobytes (KB) is used, but this is by way of example only and can be varied in other embodiments. Accordingly, illustrative embodiments can utilize any of a wide variety of alternative paging arrangements for organizing the metadata pages 110 and the user data pages 112.

The user data pages 112 are part of a plurality of logical units (LUNs) configured to store files, blocks, objects or other arrangements of data on behalf of users associated with compute nodes 102. Each such LUN may comprise particular ones of the above-noted pages of the user data area. The user data stored in the user data pages 112 can include any type of user data that may be utilized in the system 100. The term "user data" herein is therefore also intended to be broadly construed.

It is assumed in the present embodiment that the storage devices 106 comprise solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). Various combinations of multiple different types of NVM devices may also be used.

However, it is to be appreciated that other types of storage devices can be used in other embodiments. For example, a given storage system as the term is broadly used herein can include a combination of different types of storage devices, as in the case of a multi-tier storage system comprising a flash-based fast tier and a disk-based capacity tier. In such an embodiment, each of the fast tier and the capacity tier of the multi-tier storage system comprises a plurality of storage devices with different types of storage devices being used in different ones of the storage tiers. For example, the fast tier may comprise flash drives while the capacity tier comprises hard disk drives. The particular storage devices used in a given storage tier may be varied in other embodiments, and multiple distinct storage device types may be used within a single storage tier. The term "storage device" as used herein is intended to be broadly construed, so as to encompass, for example, flash drives, solid state drives, hard disk drives, hybrid drives or other types of storage devices.

In some embodiments, the content addressable storage system 105 illustratively comprises a scale-out all-flash storage array such as an XtremIO™ storage array from Dell EMC of Hopkinton, Mass. Other types of storage arrays, including by way of example VNX® and Symmetrix VMAX® storage arrays also from Dell EMC, can be used to implement storage systems in other embodiments.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing a given storage system in an illustrative embodiment include all-flash and hybrid flash storage arrays such as Unity™, software-defined storage products such as ScaleIO™ and ViPR®, cloud storage products such as Elastic Cloud Storage (ECS), object-based storage products such as Atmos®, and scale-out NAS clusters comprising Isilon® platform nodes and associated accelerators, all from Dell EMC. Combinations of multiple ones of these and other storage products can also be used in implementing a given storage system in an illustrative embodiment.

The content addressable storage system 105 in the embodiment of FIG. 1 is configured to generate hash metadata providing a mapping between content-based digests of respective ones of the user data pages 112 and corresponding physical locations of those pages in the user data area. The hash metadata generated by the content addressable storage system 105 is illustratively stored as metadata pages 110 in the metadata area.

The generation and storage of the hash metadata is assumed to be performed under the control of the storage controller 108. The hash metadata may be stored in the metadata area in a plurality of entries corresponding to respective buckets each comprising multiple cache lines, although other arrangements can be used.

Figure 2:
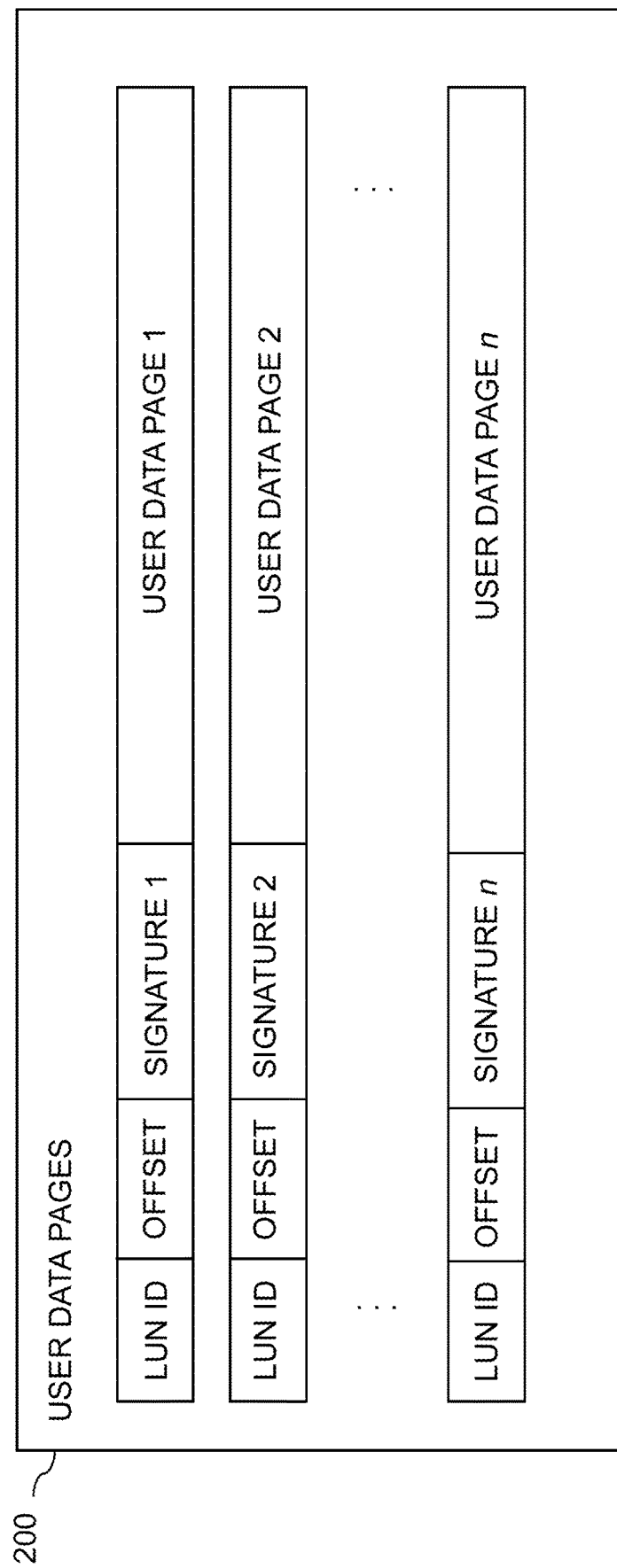
FIG. 2 shows an example of a set of user data pages in an illustrative embodiment.

Each of the metadata pages 110 characterizes a plurality of the user data pages 112. For example, as illustrated in FIG. 2, a given set of user data pages 200 representing a portion of the user data pages 112 illustratively comprises a plurality of user data pages denoted User Data Page 1, User Data Page 2, . . . User Data Page n. Each of the user data pages in this example is characterized by a LUN identifier, an offset and a content-based signature. The content-based signature is generated as a hash function of content of the corresponding user data page. Illustrative hash functions that may be used to generate the content-based signature include SHA1, where SHA denotes Secure Hashing Algorithm, or other SHA protocols known to those skilled in the art. The content-based signature is utilized to determine the location of the corresponding user data page within the user data area of the storage devices 106 of the content addressable storage system 105.

Each of the metadata pages 110 in the present embodiment is assumed to have a signature that is not content-based. For example, the metadata page signatures may be generated using hash functions or other signature generation algorithms that do not utilize content of the metadata pages as input to the signature generation algorithm. Also, each of the metadata pages is assumed to characterize a different set of the user data pages.

Figure 3:
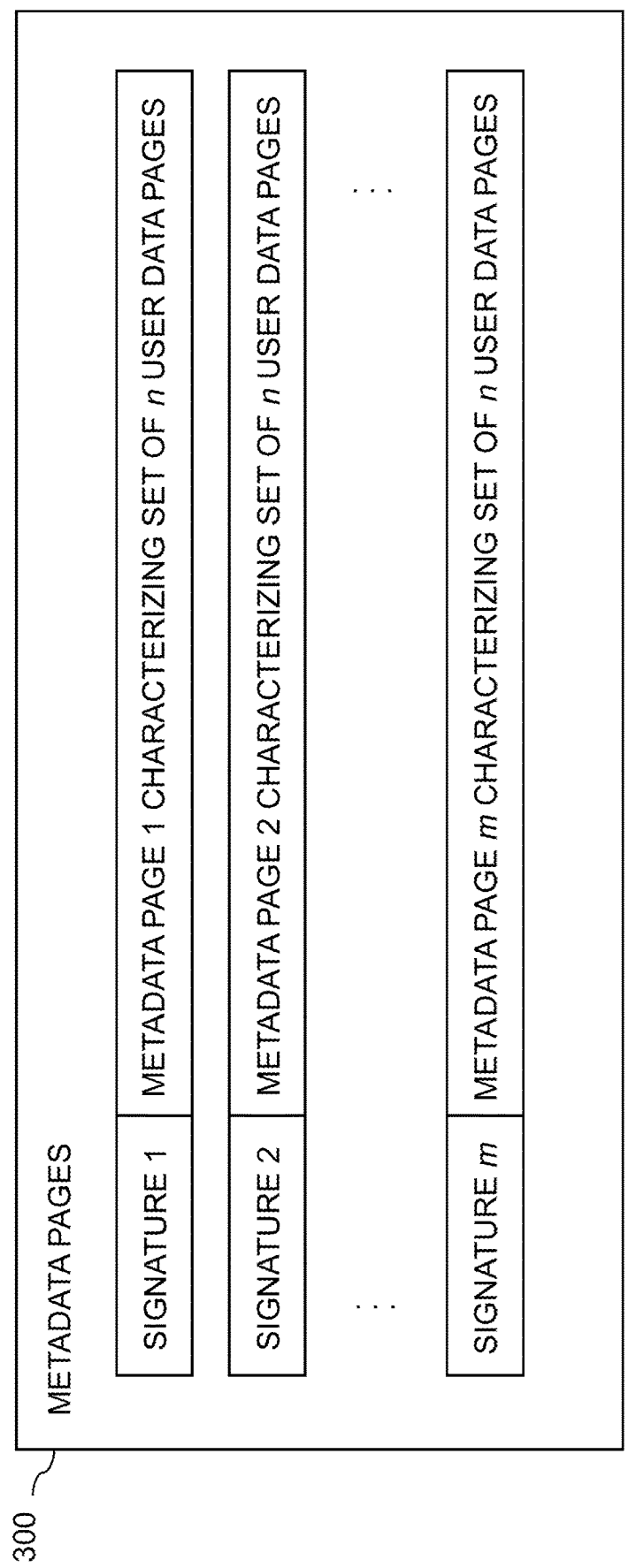
FIG. 3 shows an example of a set of metadata pages in an illustrative embodiment.

This is illustrated in FIG. 3, which shows a given set of metadata pages 300 representing a portion of the metadata pages 110 in an illustrative embodiment. The metadata pages in this example include metadata pages denoted Metadata Page 1, Metadata Page 2, . . . Metadata Page m, having respective signatures denoted Signature 1, Signature 2, . . . Signature m. Each such metadata page characterizes a different set of n user data pages. For example, the characterizing information in each metadata page can include the LUN identifiers, offsets and content-based signatures for each of the n user data pages that are characterized by that metadata page. It is to be appreciated, however, that the user data and metadata page configurations shown in FIGS. 2 and 3 are examples only, and numerous alternative user data and metadata page configurations can be used in other embodiments.

The content addressable storage system 105 in the FIG. 1 embodiment is implemented as at least a portion of a clustered storage system and includes a plurality of storage nodes 115 each comprising a corresponding subset of the storage devices 106. Other clustered storage system arrangements comprising multiple storage nodes can be used in other embodiments. A given clustered storage system may include not only storage nodes 115 but also additional storage nodes 120 coupled to network 104. Alternatively, the additional storage nodes 120 may be part of another clustered storage system of the system 100. Each of the storage nodes 115 and 120 of the system 100 is assumed to be implemented using at least one processing device comprising a processor coupled to a memory.

The storage controller 108 of the content addressable storage system 105 is implemented in a distributed manner so as to comprise a plurality of distributed storage controller components implemented on respective ones of the storage nodes 115 of the content addressable storage system 105. The storage controller 108 is therefore an example of what is more generally referred to herein as a "distributed storage controller." In subsequent description herein, the storage controller 108 may be more particularly referred to as a distributed storage controller.

Each of the storage nodes 115 in this embodiment further comprises a set of processing modules configured to communicate over one or more networks with corresponding sets of processing modules on other ones of the storage nodes 115. The sets of processing modules of the storage nodes 115 collectively comprise at least a portion of a distributed storage controller 108 of the content addressable storage system 105.

The distributed storage controller 108 in the present embodiment is configured to implement opportunistic compression of replicated data in the content addressable storage system 105.

The modules of the distributed storage controller 108 in the present embodiment more particularly comprise different sets of processing modules implemented on each of the storage nodes 115. The set of processing modules of each of the storage nodes 115 comprises at least a control module 108C, a data module 108D and a routing module 108R. The distributed storage controller 108 further comprises one or more management ("MGMT") modules 108M. For example, only a single one of the storage nodes 115 may include a management module 108M. It is also possible that management modules 108M may be implemented on each of at least a subset of the storage nodes 115.

In some embodiments, the content addressable storage system 105 comprises an XtremIO™ storage array suitably modified to incorporate opportunistic compression techniques as disclosed herein. In arrangements of this type, the control modules 108C, data modules 108D and routing modules 108R of the distributed storage controller 108 illustratively comprise respective C-modules, D-modules and R-modules of the XtremIO™ storage array. The one or more management modules 108M of the distributed storage controller 108 in such arrangements illustratively comprise a system-wide management module ("SYM module") of the XtremIO™ storage array, although other types and arrangements of system-wide management modules can be used in other embodiments. Accordingly, opportunistic compression in some embodiments is implemented under the control of at least one system-wide management module of the distributed storage controller 108.

In the above-described XtremIO™ storage array example, each user data page typically has a size of 8 KB and its content-based signature is a 20-byte signature generated using an SHA1 hash function. Also, each page has a LUN identifier and an offset, and so is characterized by <lun_id, offset, signature>.

As mentioned previously, storage controller components in an XtremIO™ storage array illustratively include C-module and D-module components. For example, separate instances of such components can be associated with each of a plurality of storage nodes in a clustered storage system implementation.

The distributed storage controller in this example is configured to group consecutive pages into page groups, to arrange the page groups into slices, and to assign the slices to different ones of the C-modules.

The D-module allows a user to locate a given user data page based on its signature. Each metadata page also has a size of 8 KB and includes multiple instances of the <lun_id, offset, signature> for respective ones of a plurality of the user data pages. Such metadata pages are illustratively generated by the C-module but are accessed using the D-module based on a metadata page signature.

The metadata page signature in this embodiment is a 20-byte signature but is not based on the content of the metadata page. Instead, the metadata page signature is generated based on an 8-byte metadata page identifier that is a function of the LUN identifier and offset information of that metadata page.

If a user wants to read a user data page having a particular LUN identifier and offset, the corresponding metadata page identifier is first determined, and then the metadata page signature is computed and the metadata page is read using the computed signature. In this embodiment, the metadata page signature is more particularly computed using a signature generation algorithm that generates the signature to include a hash of the 8-byte metadata page identifier, one or more ASCII codes for particular predetermined characters, as well as possible additional fields. The last bit of the metadata page signature may always be set to a particular logic value so as to distinguish it from the user data page signature in which the last bit may always be set to the opposite logic value.

The metadata page signature is used to retrieve the metadata page via the D-module. This metadata page will include the <lun_id, offset, signature> for the user data page if the user page exists. The signature of the user data page is then used to retrieve that user data page, also via the D-module.

The content addressable storage system 105 in the FIG. 1 embodiment is assumed to be configured to participate in a replication process with a second storage system that is not explicitly shown in the figure. The replication process is illustratively implemented utilizing what is referred to as "opportunistic compression." More particularly, in this embodiment, the storage controller 108 comprises replication control logic configured to request from one of the data modules 108D of the content addressable storage system 105 at least one data page to be replicated to the second storage system as part of the replication process. The second storage system can be implemented on the same processing platform as the content addressable storage system 105 or on a different processing platform. The replication control logic may comprise software, hardware or firmware, or combinations thereof, implemented in one or more other modules, such as control modules 108C or management module(s) 108M.

In some embodiments, the replication control logic comprises at least a portion of a replication engine of the storage controller 108. An example of such a replication engine and its associated processing operations will be described in more detail below in conjunction with the embodiments of FIGS. 5 and 6.

Responsive to the requested data page being already available in compressed form in the data module 108D, the replication control logic receives from the data module 108D the requested data page in compressed form with a compressed data indicator, and transmits the requested data page in compressed form to the second storage system along with at least a portion of a content-based signature of the requested data page. The replication control logic of the content addressable storage system 105 may be further configured to transmit the requested data page in compressed form to the second storage system while bypassing performance of an end-to-end test on the requested data page that would otherwise normally be performed in the content addressable storage system 105 as part of the replication process.

The second storage system responsive to receipt of the requested data page in compressed form from the content addressable storage system 105 is configured to decompress the requested data page and to perform the end-to-end test on the requested data page using the content-based signature of the requested data page received from the content addressable storage system 105. This decompressing of the requested data page and the performance of the end-to-end test on the requested data page are illustratively performed by a replication engine implemented in a storage controller of the second storage system. Alternatively, the decompressing of the requested data page and the performance of the end-to-end test on the requested data page may be performed by a data module of the second storage system.

Responsive to the requested data page not being already available in compressed form in the data module 108D, the replication control logic receives from the data module 108D the requested data page in uncompressed form with an uncompressed data indicator, and transmits the requested data page in uncompressed form to the second storage system. The replication control logic of the content addressable storage system 105 may be further configured to transmit the requested data page in uncompressed form to the second storage system subsequent to performing an end-to-end test on the requested data page as part of the replication process.

It should be understood that the particular arrangement of storage controller processing modules 108C, 108D, 108R and 108M as shown in the FIG. 1 embodiment is presented by way of example only. Numerous alternative arrangements of processing modules of a distributed storage controller may be used to implement opportunistic compression in a clustered storage system in other embodiments.

Although illustratively shown as being implemented within the content addressable storage system 105, the storage controller 108 in other embodiments can be implemented at least in part within the computer system 101, in another system component, or as a stand-alone component coupled to the network 104.

The computer system 101 and content addressable storage system 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or Linux containers (LXCs), or combinations of both as in an arrangement in which Docker containers or other types of LXCs are configured to run on VMs.

As a more particular example, the storage controller 108 can be implemented in the form of one or more LXCs running on one or more VMs. Other arrangements of one or more processing devices of a processing platform can be used to implement the storage controller 108. Other portions of the system 100 can similarly be implemented using one or more processing devices of at least one processing platform.

The computer system 101 and the content addressable storage system 105 may be implemented on respective distinct processing platforms, although numerous other arrangements are possible. For example, in some embodiments at least portions of the computer system 101 and the content addressable storage system 105 are implemented on the same processing platform. The content addressable storage system 105 can therefore be implemented at least in part within at least one processing platform that implements at least a subset of the compute nodes 102.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the cluster reside in one or more other data centers in one or more other geographic locations that are potentially remote from the first geographic location. Thus, it is possible in some implementations of the system 100 for different ones of the compute nodes 102 to reside in different data centers than the content addressable storage system 105. Numerous other distributed implementations of one or both of the computer system 101 and the content addressable storage system 105 are possible. Accordingly, the content addressable storage system 105 can also be implemented in a distributed manner across multiple data centers.

It is to be appreciated that these and other features of illustrative embodiments are presented by way of example only, and should not be construed as limiting in any way.

Accordingly, different numbers, types and arrangements of system components such as computer system 101, compute nodes 102, network 104, content addressable storage system 105, storage devices 106, storage controller 108 and storage nodes 115 and 120 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations. For example, as indicated previously, in some illustrative embodiments a given content addressable storage system or other type of storage system with functionality for opportunistic compression can be offered to cloud infrastructure customers or other users as a PaaS offering.

Figure 4:
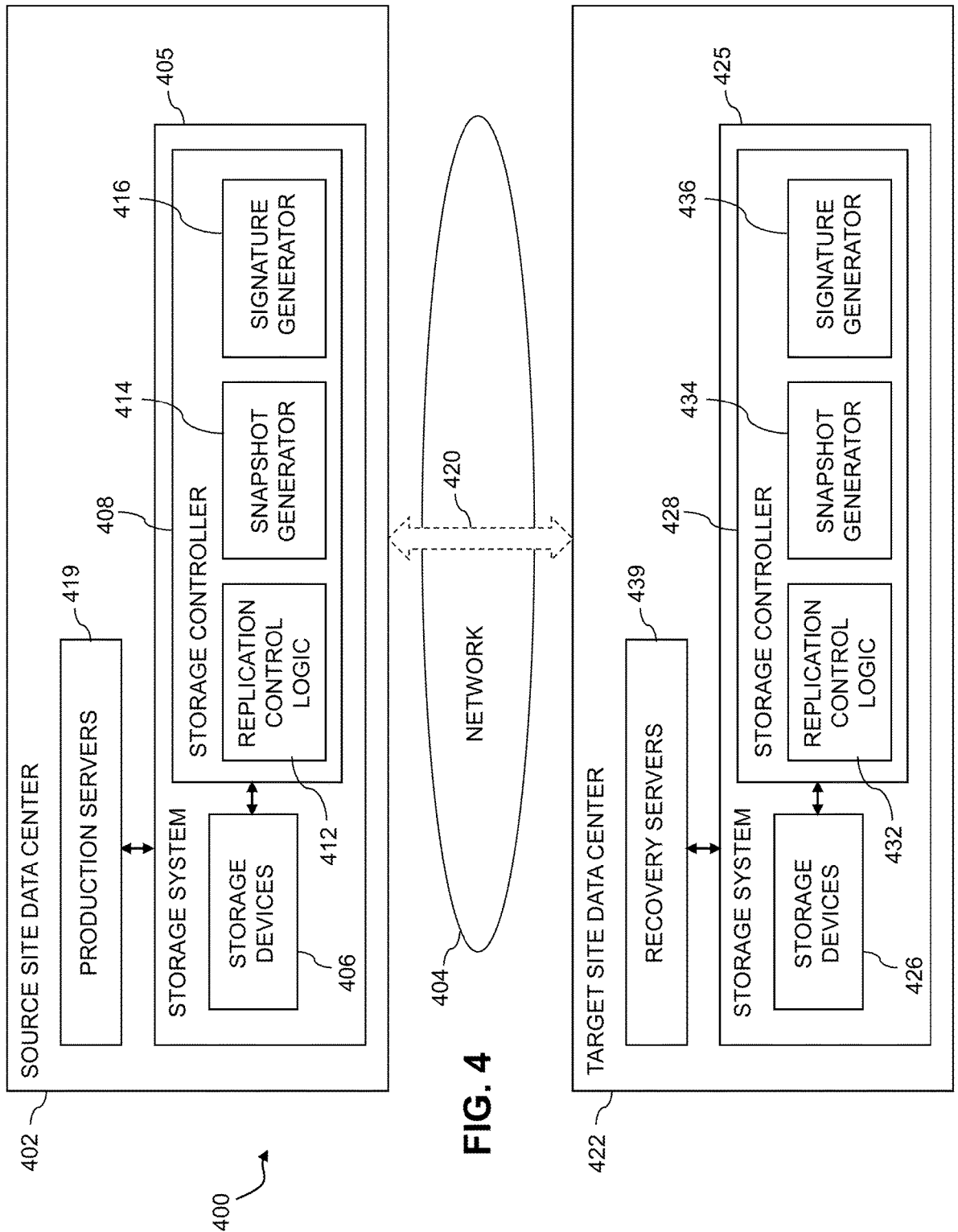
FIG. 4 is a block diagram of an information processing system comprising target site and source site storage systems configured for opportunistic compression of replicated data in an illustrative embodiment.
Figure 5:
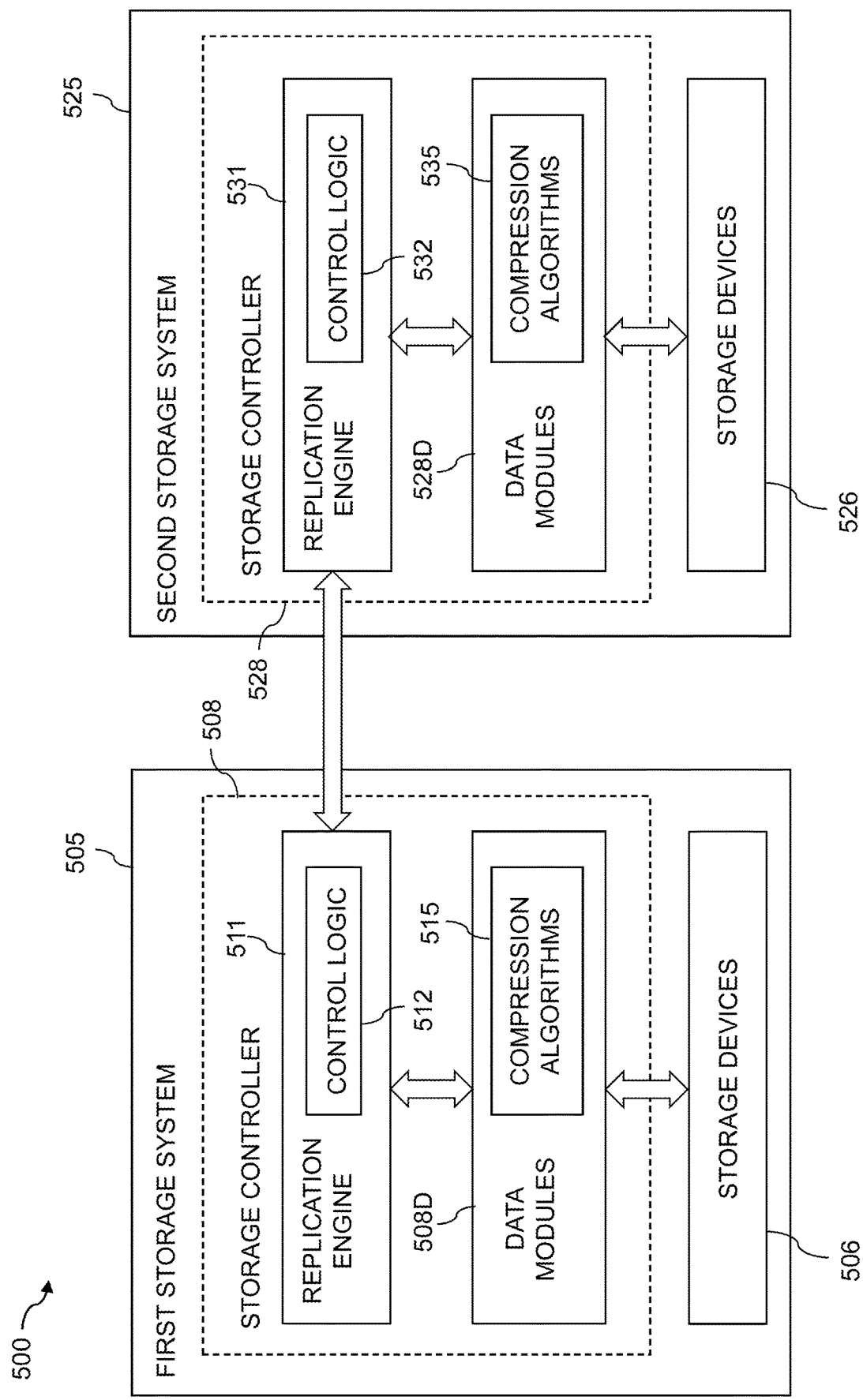
FIG. 5 illustrates interaction between replication engines implemented in respective storage controllers of respective first and second storage systems in an illustrative embodiment.

Additional details of illustrative embodiments will now be described with reference to FIGS. 4, 5 and 6. FIGS. 4 and 5 illustrate examples of information processing systems that each include a first content addressable storage system such as content addressable storage system 105 of the FIG. 1 embodiment that is configured to participate in a replication process with another storage system over at least one network.

In the context of the FIG. 4 embodiment, the storage systems participating in the replication process are assumed to be associated with respective source and target sites of the replication process. For example, the source site may comprise a production site data center and the target site may comprise a disaster recovery site data center. The FIG. 5 embodiment more generally refers to the storage systems participating in the replication process as respective first and second storage systems. The first and second storage systems illustratively comprise respective content addressable storage systems having respective sets of non-volatile memory storage devices, although other types of storage systems can be used.

Referring now to FIG. 4, an information processing system 400 in an illustrative embodiment comprises a source site data center 402 coupled to at least one network 404. The source site data center 402 comprises a storage system 405 having storage devices 406 and an associated storage controller 408. The storage controller 408 comprises replication control logic 412, snapshot generator 414 and signature generator 416. The source site data center 402 further comprises a set of production servers 419 coupled to the storage system 405.

As indicated above, the storage system 405 in the present embodiment is assumed to comprise a content addressable storage system, although other types of storage systems can be used in other embodiments.

The source site data center 402 is coupled via one or more communication channels 420 of the network 404 to a target site data center 422 of the system 400. The target site data center 422 comprises a storage system 425. The storage system 425 comprises storage devices 426 and an associated storage controller 428. The storage controller 428 comprises replication control logic 432, snapshot generator 434 and signature generator 436.

The target site data center 422 further comprises a set of recovery servers 439 coupled to the storage system 425. The storage system 425, like the storage system 405, is assumed to comprise a content addressable storage system, although again other types of storage systems can be used in other embodiments.

The source site data center 402 and the target site data center 422 are examples of what are more generally referred to herein as respective ones of a "source site" and a "target site" of an information processing system. The source site data center 402 and the target site data center 422 will therefore also be referred to herein as respective source site 402 and target site 422 of the system 400. In some embodiments, the target site 422 comprises a disaster recovery site data center and the source site 402 comprises a production site data center, although other arrangements are possible.

The source site 402 and target site 422 may be implemented in respective distinct local and remote geographic locations, although it is also possible for the two sites to be within a common facility or even implemented on a common processing platform.

It is assumed that data is replicated in system 400 from the source site 402 to the target site 422 using a cycle-based asynchronous replication process. For example, asynchronous replication may be configured to periodically transfer data in multiple cycles from the source site 402 to the target site 422. The data replicated from the source site 402 to the target site 422 can include all of the data stored in the storage system 405, or only certain designated subsets of the data stored in the storage system 405. Different replication processes of different types can be implemented for different parts of the stored data.

In order to conserve bandwidth on the communication channels 420 between the source site 402 and the target site 422, data is transferred incrementally. This means that instead of sending all the data stored at the source site 402 to the target site 422 in each cycle, only the data that has been changed during each cycle is transferred. The changed data is an example of what is more generally referred to herein as "differential data." A given set of differential data transferred from the source site 402 to the target site 422 in a given one of the cycles of the cycle-based asynchronous replication process represents a "delta" between a pair of source site snapshots generated by the snapshot generator 414 of the storage controller 408 for a corresponding pair of the cycles. Each source site snapshot captures the state at a particular point in time of the data to be replicated from the source site 402 to the target site 422. It is assumed that one such source site snapshot is generated by the snapshot generator 414 in conjunction with each of the cycles of the asynchronous replication process.

A given one the cycles of the cycle-based asynchronous replication process illustratively encompasses an amount of time spent sending a corresponding one of the sets of differential data or deltas from the source site 402 to the target site 422. There is a lag time between the data at the source site 402 and the replicated data at the target site 422. More particularly, the replicated data at the target site 422 is "older" than the data at the source site 402 by the lag time, as the production servers 419 continue to write to the storage system 405 after the source site snapshots are taken for respective ones of the cycles. For example, if the cycles of the cycle-based asynchronous replication process each take 30 seconds, then the lag time in some embodiments may vary between 30 seconds and 60 seconds. A recover point objective or RPO in some embodiments can be specified as a maximum amount of lag time that the replicated data can have.

The lag time in some embodiments is more particularly specified as an amount of time between initiation of transfer of a given one of the sets of differential data by the storage system 405 of the source site 402 and update of the corresponding target site snapshot by the storage system 425 of the target site 422. It is to be appreciated, however, that other specifications of the lag time can be used.

As noted above, an advantage of transferring data incrementally from the source site 402 to the target site 422 using a cycle-based asynchronous replication process is that it conserves bandwidth on the communication channels 420. For example, each byte of data written by the production servers 419 to the storage system 405 need only be transferred once. However, the downside is that if there is problem in any one of the cycles, the replicated data at the target site 422 will be corrupted from that point on. This is a silent corruption that without appropriate verification of the replicated data will not be discovered until recovery servers 439 are started and begin to utilize the replicated data in conjunction with disaster recovery or another similar type of recovery situation. It is therefore very important for the replicated data to be verified in an appropriate manner before such a recovery situation arises. Illustrative embodiments provide particularly efficient techniques for automatic implementation of such verification without the need for administrator intervention.

The production servers 419 at the source site 402 illustratively run applications for users of the system 400. These servers are configured to store application data in the storage system 405. This application data is illustratively part of the data stored in storage system 405 that is replicated from the source site 402 to the target site 422. The recovery servers 439 at the target site 422 are configured to take up the running of the applications for the users of the system 400 in the event of a disaster recovery or other recovery situation. The applications on the recovery servers 439 of the target site 422 are started using the data that has been replicated to the target site 422 in the cycle-based asynchronous replication process.

The production servers 419 and recovery servers 439 of the respective source site 402 and target site 422 illustratively comprise respective processing devices of one or more processing platforms of the corresponding source site 402 or target site 422. For example, these servers can comprise respective VMs each having a processor and a memory, although numerous other configurations are possible. At least portions of the source site 402 and target site 422 can be implemented in cloud infrastructure such as an AWS system or another cloud-based system such as GCP or Microsoft Azure.

As indicated previously, the storage systems 405 and 425 of the source and target sites 402 and 422 are configured in the present embodiment for automatic verification of asynchronously replicated data over multiple cycles of a cycle-based asynchronous replication process. This illustratively involves asynchronously replicating data from the storage devices 406 of the storage system 405 to the storage devices 426 of the storage system 425 and automatically verifying the correctness of portions of the replicated data over multiple cycles.

As will be described in more detail below, the automatic verification of the asynchronously replicated data in the present embodiment may be performed in a manner that advantageously avoids the need to verify all of the transferred data in each cycle. As a result, the cycles can be made significantly more compact than would otherwise be possible. This results in enhanced efficiency in the replication process and thereby facilitates the achievement of recover point objectives in system 400.

As noted above, the storage systems 405 and 425 of the source and target sites 402 and 422 may comprise respective content addressable storage systems having respective sets of non-volatile memory storage devices.

Additionally or alternatively, the storage systems 405 and 425 of the source and target sites 402 and 422 may comprise respective clustered storage systems having respective sets of storage nodes each having a plurality of storage devices.

In some embodiments, the storage systems 405 and 425 illustratively comprise scale-out all-flash storage arrays such as XtremIO™ storage arrays from Dell EMC of Hopkinton, Mass. Other types of storage arrays, including by way of example Unity™, VNX® and Symmetrix VMAX® storage arrays also from Dell EMC, can be used to implement storage systems in other embodiments. A given such storage array can be configured to provide storage redundancy using well-known RAID techniques such as RAID 5 or RAID 6, although other storage redundancy configurations can be used.

The term "storage system" as used herein is therefore intended to be broadly construed, and should not be viewed as being limited to content addressable storage systems or flash-based storage systems.

The storage devices 406 and 426 of respective storage systems 405 and 425 illustratively implement a plurality of LUNs configured to store files, blocks, objects or other arrangements of data.

In the present embodiment, the storage system 425 of the target site 422 is configured to participate in a cycle-based asynchronous replication process with the storage system 405 of the source site 402. This cycle-based asynchronous replication process is illustratively implemented in system 400 by cooperative interaction of the storage systems 405 and 425 over network 404 using their respective replication control logic 412 and 432, snapshot generators 414 and 434, and signature generators 416 and 436. Examples of cycles of an illustrative cycle-based asynchronous replication process of this type without automatic verification and with automatic verification will be described in more detail below.

The storage system 425 of the target site 422 is more particularly configured in this embodiment to receive from the storage system 405 of the source site 402, in respective ones of a plurality of cycles of the cycle-based asynchronous replication process, corresponding sets of differential data representing respective deltas between pairs of source site snapshots for respective pairs of the cycles. The source site snapshots are generated by the snapshot generator 414 of the storage controller 408.

The storage system 425 of the target site 422 illustratively utilizes the sets of differential data received in the respective ones of the cycles to update respective target site snapshots for those cycles. The target site snapshots are generated by the snapshot generator 434 of the storage controller 428.

Over multiple ones of the cycles, the storage system 425 of the target site 422 generates target site signatures for respective different portions of a designated one of the updated target site snapshots. The target site signatures are generated by the signature generator 436 of the storage controller 428. The storage system 425 also receives from the storage system 405 of the source site 402 corresponding source site signatures for respective different portions of a designated one of the source site snapshots. The source site signatures are generated by the signature generator 416 of the storage controller 408. The storage system 425 compares the target site and source site signatures over the multiple cycles in order to verify that the designated target site and source site snapshots are equivalent.

The verification of equivalence of the designated target site and source site snapshots in this embodiment is therefore spread over the multiple cycles, with pairs of target site and source site signatures for the different portions of those snapshots being compared in respective ones of the multiple cycles.

Terms such as "equivalent" and "equivalence" as used herein in conjunction with verification of replicated data by comparison of target site and source site snapshots are intended to be broadly construed to encompass various arrangements for confirming that the target site snapshot is an accurate and correct version of its corresponding source site snapshot. Such equivalence herein is a type of functional equivalence in that the replicated data when utilized by one or more applications running on the recovery servers 439 will produce the same results that would be produced by the corresponding source site data when utilized by one or more applications running on the production servers 419.

It is also important to note that the transferring of the data in cycles in this embodiment is separate from the verifying of the transferred data. The data transferred each cycle comprises the above-noted delta between two snapshots taken at respective ones of two different points in time. The data verification illustratively involves selecting a particular one of the target site snapshots, and then verifying the data in that snapshot over multiple cycles through the comparison of target site signatures for different portions of the selected target site snapshot to corresponding source site signatures. The transferred data comprising the deltas sent from the source site 402 to the target site 422 are not verified in each cycle.

The target site and source site signatures generated by the respective signature generators 416 and 436 illustratively comprise at least one of a checksum and a hash of corresponding portions of the designated target site and source site snapshots.

The different portions of the designated target site and source site snapshots for which the verification of equivalence is spread over the multiple cycles of the cycle-based asynchronous replication process may comprise respective percentages of the designated target site and source site snapshots. For example, different percentages of the designated target site and source site snapshots may be utilized in different ones of the multiple cycles. Alternatively, a fixed percentage of the designated target site and source site snapshots may be utilized in each of the multiple cycles. As a more particular example of the latter approach, the target site and source site signatures for different n percent portions of the designated target site and source site snapshots are verified in each of 100/n of the cycles.

In these and other embodiments, the different portions of the designated target site and source site snapshots for which the verification of equivalence is spread over the multiple cycles can be determined at least in part based on a number n of the cycles of the cycle-based asynchronous replication process that are expected to be executed within a given time period. For example, the different portions of the designated target site and source site snapshots for which the verification of equivalence is spread over the multiple cycles may be determined by first determining the expected number of cycles n for the given time period and then computing 100/n to determine a percentage of the designated target site and source site snapshots to be verified in each of the n cycles.

Additionally or alternatively, the different portions of the designated target site and source site snapshots for which the verification of equivalence is spread over the multiple cycles can be dynamically adapted over time in order to control a lag time between initiation of transfer of a given one of the sets of differential data by the storage system 405 of the source site 402 and update of the corresponding target site snapshot by the storage system 425 of the target site 422.

For example, such dynamic adaptation can be implemented by, for a current one of the multiple cycles, calculating a verification rate as a function of a time elapsed for verification of a given one of the portions in a previous one of the multiple cycles, calculating an amount of time remaining in a recover point objective period for the current cycle, and multiplying the verification rate by the amount of time remaining in the recover point objective period for the current cycle to determine a particular portion of the designated target site and source site snapshots to be verified in the current cycle.

If the particular portion determined by multiplying the verification rate by the amount of time remaining in the recover point objective period for the current cycle is less than a specified minimum portion, the minimum portion is verified in the current cycle.

Further details regarding automatic verification of asynchronously replicated data suitable for use in illustrative embodiments herein can be found in U.S. patent application Ser. No. 15/662,809, filed Jul. 28, 2017, now U.S. Pat. No. 10,437,855, and entitled "Automatic Verification of Asynchronously Replicated Data," which is incorporated by reference herein. Other embodiments need not utilize these automatic verification techniques, and can be implemented using alternative verification techniques as well as other types of replication processes. Accordingly, illustrative embodiments herein are not limited to use with cycle-based asynchronous replication, but are more generally applicable to other types of data replication.

Each of the source site 402 and target site 422 in the FIG. 4 embodiment is assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as VMs or LXCs, or combinations of both as in an arrangement in which Docker containers or other types of LXCs are configured to run on VMs.

As a more particular example, the storage controllers 408 and 428 or various components thereof can each be implemented in the form of one or more LXCs running on one or more VMs. Other arrangements of one or more processing devices of a processing platform can be used to implement the storage controllers 408 and 428 and/or their respective components. Other portions of the system 400 can similarly be implemented using one or more processing devices of at least one processing platform.

The source site 402 and target site 422 are illustratively implemented on respective distinct processing platforms, although numerous other arrangements are possible. For example, in some embodiments at least portions of the source site 402 and the target site 422 may be implemented on the same processing platform. The term "processing platform" as used herein is intended to be broadly construed so as to encompass, by way of illustration and without limitation, multiple sets of processing devices and associated storage systems that are configured to communicate over one or more networks.

Again, it is to be appreciated that these and other features of illustrative embodiments are presented by way of example only, and should not be construed as limiting in any way. Accordingly, different numbers, types and arrangements of system components such as source and target sites 402 and 422 and their respective storage systems 405 and 425 and storage controllers 408 and 428 can be used in other embodiments. In these other embodiments, only subsets of these components, or additional or alternative sets of components, may be used, and such components may exhibit alternative functionality and configurations.

The replication process carried out between the source site storage system 405 and the target site storage system 425 in the FIG. 4 embodiment utilizes opportunistic compression techniques of the type previously described in conjunction with the content addressable storage system 105 of FIG. 1. Examples of such opportunistic compression arrangements will now be described in further detail with reference to FIGS. 5 and 6.

Turning now to FIG. 5, an information processing system 500 comprises a first storage system 505 comprising storage devices 506 and a distributed storage controller 508. The distributed storage controller 508 comprises a plurality of data modules 508D and a replication engine 511 having control logic 512. The data modules 508D implement compression algorithms 515 for compressing data in conjunction with storage of the data in the storage devices 506. The replication engine 511 and its associated control logic 512 may be implemented at least in part in one or more control modules and/or management modules of the distributed storage controller 508, although such modules are not explicitly shown in the figure. The distributed storage controller 508 may be viewed as corresponding to an instance of storage controller 108 of FIG. 1 or storage controller 408 or 428 of FIG. 4.

The information processing system 500 further comprises a second storage system 525 comprising storage devices 526 and a distributed storage controller 528. The distributed storage controller 528 comprises a plurality of data modules 528D and a replication engine 531 having control logic 532. The data modules 528D implement compression algorithms 535 for compressing data in conjunction with storage of the data in the storage devices 526. The replication engine 531 and its associated control logic 532 may be implemented at least in part in one or more control modules and/or management modules of the distributed storage controller 528, although such modules are not explicitly shown in the figure. The distributed storage controller 528 may be viewed as corresponding to an instance of storage controller 108 of FIG. 1 or storage controller 408 or 428 of FIG. 4.

The compression algorithms 515 and 535 can include any of a number of well-known algorithms utilized to compress data in storage systems. Such algorithms are therefore not described in detail herein.

In the FIG. 5 embodiment, the first storage system 505 is configured to participate in a replication process with the second storage system 525. The replication process is carried out at least in part by the replication engines 511 and 531 of the respective storage systems 505 and 525 as directed by control logic 512 and 532. Such control logic is an example of what is more generally referred to herein as "replication control logic," although the latter term is intended to be broadly construed and accordingly in some implementations can encompass an entire replication engine such as replication engine 511 or 531. Replication control logic as disclosed herein can be implemented at least in the part in the form of software, possibly in combination with associated hardware and/or firmware.

The data modules 508D of the first storage system 505 are assumed to be configured to implement one or more RAID algorithms that involve compressing data pages in conjunction with storage of the data pages in the storage devices 506 of the first storage system 505. At least a subset of the data modules 508D are each further assumed to comprise one or more caches in which data pages are stored in uncompressed form prior to being compressed for storage in the storage devices 506. The data modules 528D of the second storage system 525 are configured in a similar manner.

As part of the replication process, the replication engine 511 utilizes control logic 512 to request from a given one of the data modules 508D at least one data page to be replicated to the second storage system 525.

It is possible that the requested data page is already available in compressed form in the given data module. The opportunistic compression arrangement in the present embodiment exploits this possibility. For example, it may be possible for the requested data page to be supplied directly to the replication engine 511 from the given data module in compressed form in response to the request.

If the requested data page is already available in compressed form in the given data module, the replication engine 511 receives from the given data module the requested data page in compressed form with a compressed data indicator, and transmits the requested data page in compressed form to the second storage system 525 along with at least a portion of a content-based signature of the requested data page. This advantageously avoids the need for the storage controller 508 of the first storage system 505 to decompress and recompress the requested data page that is already available in compressed form, thereby conserving computational resources of the first storage system 505.

The compressed data indicator illustratively comprises a single-bit indicator, such as a compressed data flag. For example, the set value ("logic 1") of the compressed data flag can be used to indicate that the corresponding data page is in compressed form, while the reset value ("logic 0") of the compressed data flag can be used to indicate that the corresponding data page is in uncompressed form. The latter indication is an example of a type of uncompressed data indicator as that term is used herein. In other embodiments, other types of flags or alternative single-bit or multi-bit indicators may be used. A given such indicator may be stored in association with each of the data pages to be replicated. Alternatively, one indicator can indicate compressed or uncompressed status for multiple data pages or other types or arrangements of data to be replicated.

The content-based signature illustratively comprises at least one of a checksum and a hash of content of the requested data page. For example, a content-based signature may be generated using the SHA1 hash function as previously described in conjunction with the user data page signatures of FIG. 2.

The replication engine 511 in this case transmits the requested data page in compressed form to the second storage system 525 while bypassing performance of an end-to-end test on the requested data page that would otherwise normally be performed in the first storage system 505 as part of the replication process. Again, this advantageously avoids the need for the storage controller 508 of the first storage system 505 to decompress the already-compressed data page, thereby further conserving computational resources of the first storage system 505. Performance of an "end-to-end test" on a given data page in this context and other similar contexts herein is intended to encompass an arrangement in which a received compressed data page is decompressed and its content-based signature as generated at a receiving end of a transmission channel or link is compared to a content-based signature previously generated for that page at a transmitting end of that transmission channel or link. Other types of end-to-end tests can be used in other embodiments.

The compressed data indicator may also be transmitted with the requested data page to the second storage system 525.

The second storage system 525 responsive to receipt of the requested data page in compressed form from the first storage system 505 is configured to decompress the requested data page and to perform the end-to-end test on the requested data page using the content-based signature of the requested data page received from the first storage system 505. As indicated previously, in some implementations of the system 500 only a portion of the content-based signature of the requested data page is transmitted from the first storage system 505 to the second storage system 525. In such implementations, the transmitted portion of the content-based signature is utilized by the second storage system 525 in performing the end-to-end test. The end-to-end test is illustratively performed by or under the control of the replication engine 531 of the second storage system 525, possibly in cooperation with at least one of the data modules 528D and a particular one of its compression algorithms 535. It is also possible that the end-to-end test may be performed on the requested data page by the data module itself without intervention or other participation of the replication engine 531.

If the requested data page is not already available in compressed form in the given data module, the replication engine 511 receives from the given data module the requested data page in uncompressed form with an uncompressed data indicator, and transmits the requested data page in uncompressed form to the second storage system 525.

The replication engine 511 in this case transmits the requested data page in uncompressed form to the second storage system 525 subsequent to performing an end-to-end test on the requested data page as part of the replication process.

The uncompressed data indicator may also be transmitted with the requested data page to the second storage system 525.

Additional data pages are requested by the replication engine 511 and handled in the manner described above as part of the replication process carried out by the first and second storage systems 505 and 525.

In the above-described embodiments, replicated data pages are illustratively transmitted from the first storage system 505 to the second storage system 525 in compressed form or uncompressed form depending on availability of the data pages in compressed form in the first storage system 505. Other embodiments can utilize various types of additional compression signaling in conjunction with transmission of uncompressed data pages. For example, illustrative embodiments can incorporate compression signaling techniques such as those described in U.S. Patent Application No. 15/793,147, filed concurrently herewith and entitled "Compression Signaling for Replication Process in a Content Addressable Storage System," which is incorporated by reference herein.

The operation of the information processing system 500 will now be described in further detail with reference to the flow diagram of the illustrative embodiment of FIG. 6. The process as shown includes steps 600 through 610, and is suitable for use in the system 500 but is more generally applicable to other types of information processing systems, including systems 100 and 400 of respective FIGS. 1 and 4, in which multiple storage systems are configured participate in a replication process. The steps of the process of FIG. 6 are assumed to be performed primarily by a replication engine of a source site storage system, in cooperation with one or more backend data modules of that system. The replication engine is assumed to be implemented in a storage controller of the storage system, such as storage controller 108, 408 or 508 of respective systems 100, 400 or 500 of FIGS. 1, 4 and 5.

In step 600, the replication engine sends request to a backend data module of the source site storage system for data to be replicated to a target site storage system. For example, with reference to the system 500 of FIG. 5, replication engine 511 sends a request for one or more data pages, or other type or arrangement of data to be replicated, to the appropriate one of the data modules 508D. The data modules 508D and 528D are referred to as "backend" data modules in this embodiment relative to "frontend" components such as replication engines 511 and 531 that control the replication process.

In step 602, a determination is made as to whether or not the requested data is already available in compressed form at one of the backend data modules. This determination is illustratively made by the backend data module responsive to receipt of the request. For example, a given one of the backend data modules 508D can make this determination responsive to the request from the replication engine 511. If the requested data is already available in compressed form at one of the backend data modules, the process moves to step 604, and otherwise moves to step 608.

In step 604, the replication engine receives the requested data in compressed form with a set compressed data flag. It is assumed in this embodiment that the backend data module storing the data to be replicated maintains compressed data indicators for respective compressed data pages. For example, the backend data module may maintain the compressed data indicators as respective compressed data flags for respective ones of the data pages. Accordingly, that backend data module sends the requested data, such as a given requested data page, to the replication engine, along with the compressed data flag for that data page. Given that the data page is compressed, the corresponding compressed data flag is set to its "logic 1" value. Thus, the backend data module sends the compressed data page along with an indication that the page is compressed. As indicated above, other types and arrangements of data can be requested by the replication engine. For example, multiple data pages can be requested in a single request.

In step 606, the replication engine transmits the requested data in compressed form to the target site storage system along with at least a portion of a content-based signature of the requested data, without performing an end-to-end test on the requested data at the source site. For example, if the requested data is a data page, the content-based signature illustratively comprises a content-based signature of that data page. Such a content-based signature can be generated in the manner previously described herein in the context of user data pages 200 in the illustrative embodiment of FIG. 2.

In step 608, the replication engine receives the requested data in uncompressed form with a reset compressed data flag. This is responsive to a determination in step 602 that the requested data is not already available in compressed form at the appropriate backend data module associated with the requested data. Accordingly, that backend data module sends the requested data, such as a given requested data page, to the replication engine, along with the compressed data flag for that data page. Given that the data page is uncompressed, the corresponding compressed data flag is reset to its "logic 0" value. Thus, the backend data module sends the uncompressed data page along with an indication that the page is uncompressed.

In step 610, the replication engine transmits the requested data in uncompressed form to the target site storage system, after performing an end-to-end test on the requested data at the source site.

Figure 6:
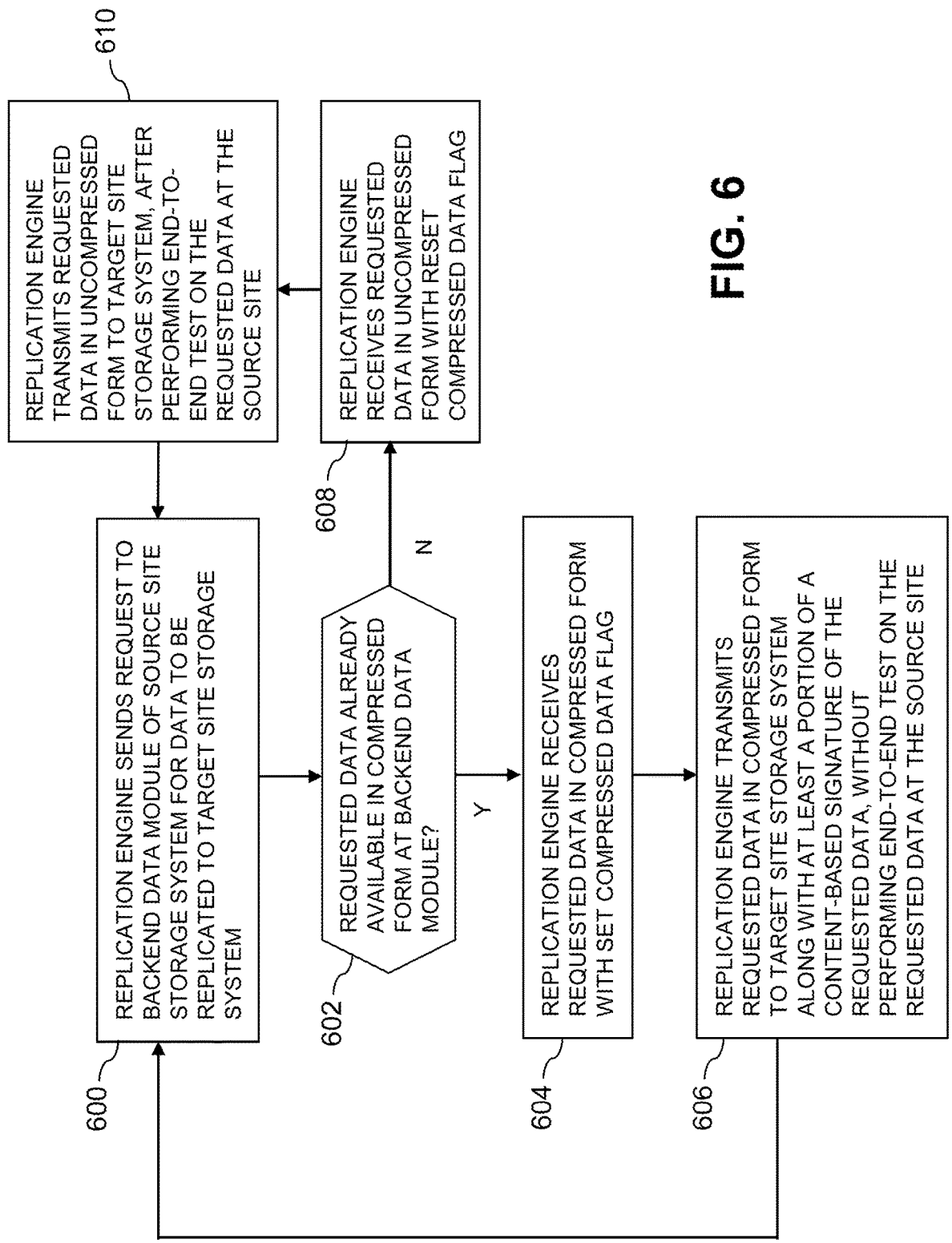
FIG. 6 is a flow diagram of a process for opportunistic compression of replicated data in an illustrative embodiment.

After completion of step 606 or step 610 for a given request, the FIG. 6 process then returns to step 600 as shown in order to process additional requests for data pages or other types and arrangements of data to be replicated from the source site storage system to the target site storage system as part of the replication process carried out between those two storage systems using their respective replication engines. For example, the FIG. 6 process may be iterated for each of a plurality of data pages that are to be replicated from the source site storage system to the target site storage system as part of the replication process.

It is also to be appreciated that the FIG. 6 process and other features and functionality for opportunistic compression of replicated data as described above can be adapted for use with other types of information systems, including by way of example an information processing system in which source site and target site storage systems are both implemented on the same processing platform.

The particular processing operations and other system functionality described in conjunction with the flow diagram of FIG. 6 are presented by way of illustrative example only, and should not be construed as limiting the scope of the disclosure in any way. Alternative embodiments can use other types of processing operations involving opportunistic compression of replicated data. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different opportunistic compression processes for respective different sets of replicated data or for different storage systems or portions thereof within a given information processing system.

Functionality such as that described in conjunction with the flow diagram of FIG. 6 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

For example, a storage controller such as storage controller 108, 408, 428, 508 or 528 that is configured to control performance of one or more steps of the FIG. 6 process can be implemented as part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. The storage controller 108, 408, 428, 508 or 528, as well as other system components, may be implemented at least in part using processing devices of such processing platforms. For example, in a distributed implementation of the storage controller 108, 408, 428, 508 or 528, respective distributed modules of such a storage controller can be implemented in respective LXCs running on respective ones of the processing devices of a processing platform.

In some embodiments, the source site and target site storage systems comprise respective XtremIO™ storage arrays suitably modified to incorporate opportunistic compression techniques as disclosed herein. As described previously, in the context of an XtremIO™ storage array, the control modules 108C, data modules 108D, routing modules 108R and management module(s) 108M of the distributed storage controller 108 in system 100 illustratively comprise C-modules, D-modules, R-modules and SYM module(s), respectively. These exemplary processing modules of the distributed storage controller 108 can be configured to implement opportunistic compression functionality using the FIG. 6 process.

For example, the metadata pages 110, the user data pages 112 and associated network connections may be distributed across the multiple processing modules of the distributed storage controller 108. The network connections illustratively include communication links established between the various modules using well-known communication protocols such as Transmission Control Protocol (TCP) and Internet Protocol (IP). For example, sets of IP links used in replication data transfer could be associated with different ones of the routing modules 108R and each such set of IP links could include a different bandwidth configuration.

Ownership of a user data logical address space within the content addressable storage system 105 is illustratively distributed among the control modules 108C. The management module 108M may include a replication engine that engages all of the control modules 108C and routing modules 108R in order to implement a data replication process within the system 100. The data replication process illustratively involves replicating data from one portion of a storage system to another portion of that system, or from one storage system to another storage system. It is desirable in these and other data replication contexts to implement opportunistic compression functionality in order to reduce consumption of computational resources at the source site and possibly also at the target site.

More particularly, assume that it is desirable in some embodiments to send replicated data in compressed form from a source site storage system to a target site storage system, in order to conserve link bandwidth. However, this can create other issues, in that compression consumes computational resources at the source site, and may be unsuccessful if it turns out that a given data page cannot be compressed. As a result, the source site storage system may expend valuable CPU cycles on certain data pages with minimal or no gain. In addition, replicated data received in compressed form at the target site storage system must be decompressed prior to verification that utilizes content-based signatures.

In the present XtremIO™ example in which data is compressed by backend data modules more specifically referred to as D-modules, a replication engine of the source site storage system generates a read request to one or more of the D-modules for a particular data page to be replicated to the target site storage system. However, the source site storage system is configured to allow the D-module to respond to the request with the data page in compressed form if the data page is already available in that form. For example, the requested data page may have been previously stored in compressed form within the corresponding storage devices.

In normal operation, the D-modules in the present XtremIO™ example will generally attempt to compress all data pages to be stored in the associated storage devices in accordance with the RAID algorithm implemented in the corresponding source site storage system. As a result, there is no significant additional computational overhead incurred at the source site storage system in returning requested data pages in compressed form if those data pages are already available to the D-modules in compressed form.

The source site storage system is also configured to allow the D-module to respond to the request with the data page in uncompressed form if the data page is not already available in compressed form. For example, the requested data page may still be in a cache of a given one of the D-modules or otherwise awaiting a test for compressibility or another type of compression attempt.

The D-module responding to the request from the replication engine returns the corresponding data page in compressed or uncompressed form as outlined above along with a compressed data flag indicating whether the data page is compressed or uncompressed.

If the returned data page is in compressed form, the replication engine does not attempt to decompress it in order to perform an end-to-end test in the source site storage system, but instead transmits that data page to the target site storage system in compressed form along with at least a portion of a content-based signature of that data page. This allows a replication engine or D-module of the target site storage system to decompress the data page and perform the end-to-end test by generating a content-based signature of the decompressed data page and comparing that content-based signature to the transmitted portion of the content-based signature. In some cases, the full content-based signature of the data page as generated using the SHA1 hash function or other signature generation algorithm is transmitted to the target site storage system along with the compressed data page for use in performing the end-to-end test. Alternatively, only a subset of the content-based signature comprising multiple hash bytes can be transmitted and utilized by the replication engine or D-module of the target site storage system in performing the end-to-end test on the received data page.

Since decompressing the data page is a computationally inexpensive operation compared to compressing the data page, the performance of an additional decompression operation at the target site is not significant relative to the substantial savings that results from avoiding compression operations at the source and target sites.

If the data page returned by the D-module of the source site storage system responsive to the request is in uncompressed form, the replication engine performs the end-to-end test in the source site storage system, and then transmits that data page to the target site storage system in uncompressed form.

The opportunistic compression techniques implemented in the XtremIO™ storage array example described above can be varied in other embodiments. For example, different types of process operations can be used in other embodiments. Furthermore, although described in the foregoing example in the context of data replication from a source to a target, the opportunistic compression techniques in other embodiments can be implemented in the context of other types of data transfer within a given storage system or from one storage system to another storage system. In addition, the above-described functionality associated with C-module, D-module, R-module and SYM module components of the XtremIO™ storage array can be incorporated into other modules or components of a centralized or distributed storage controller in other types of storage systems.

Illustrative embodiments of content addressable storage systems or other types of storage systems with opportunistic compression functionality as disclosed herein can provide a number of significant advantages relative to conventional arrangements.

For example, some embodiments can advantageously provide significantly improved efficiency in asynchronous replication and other types of data replication processes carried out between a source site and a target site of a given information processing system.

Also, illustrative embodiments can reduce consumption of network bandwidth and computational resources, and are therefore better able to achieve desired recover point objectives within the information processing system.

For example, in some embodiments, source site CPU cycles that might otherwise have been wasted on numerous unsuccessful compression attempts are entirely avoided, as is the need for recompression operations at the target site.

These and other embodiments include clustered storage systems comprising storage controllers that are distributed over multiple storage nodes. Similar advantages can be provided in other types of storage systems.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing systems 100, 400 and 500 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as storage systems 105, 405, 425, 505 and 525, or portions thereof, are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as Amazon S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100, 400 or 500. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. Although described in the context of system 100, these platforms may also be used to implement at least portions of other information processing systems in other embodiments, such as systems 400 and 500.

Figure 7:
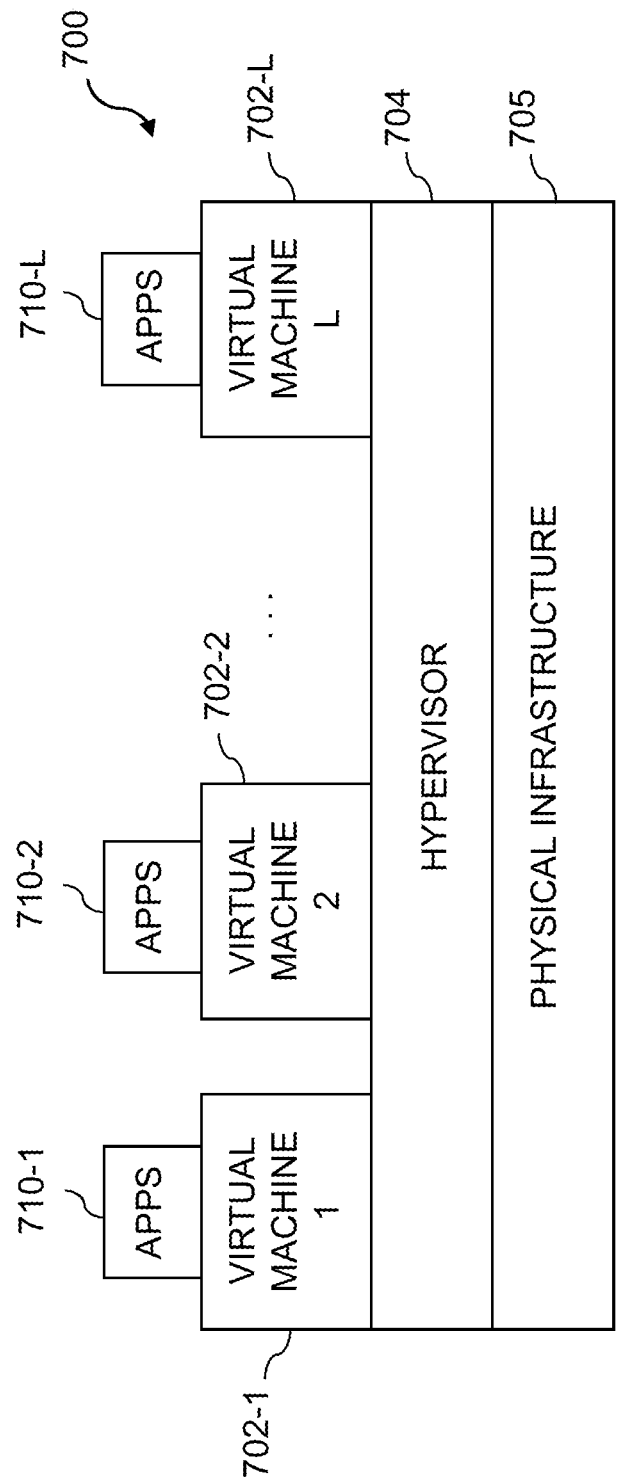
FIGS. 7 and 8 show examples of processing platforms that may be utilized to implement at least a portion of an information processing system in illustrative embodiments.
Figure 8:
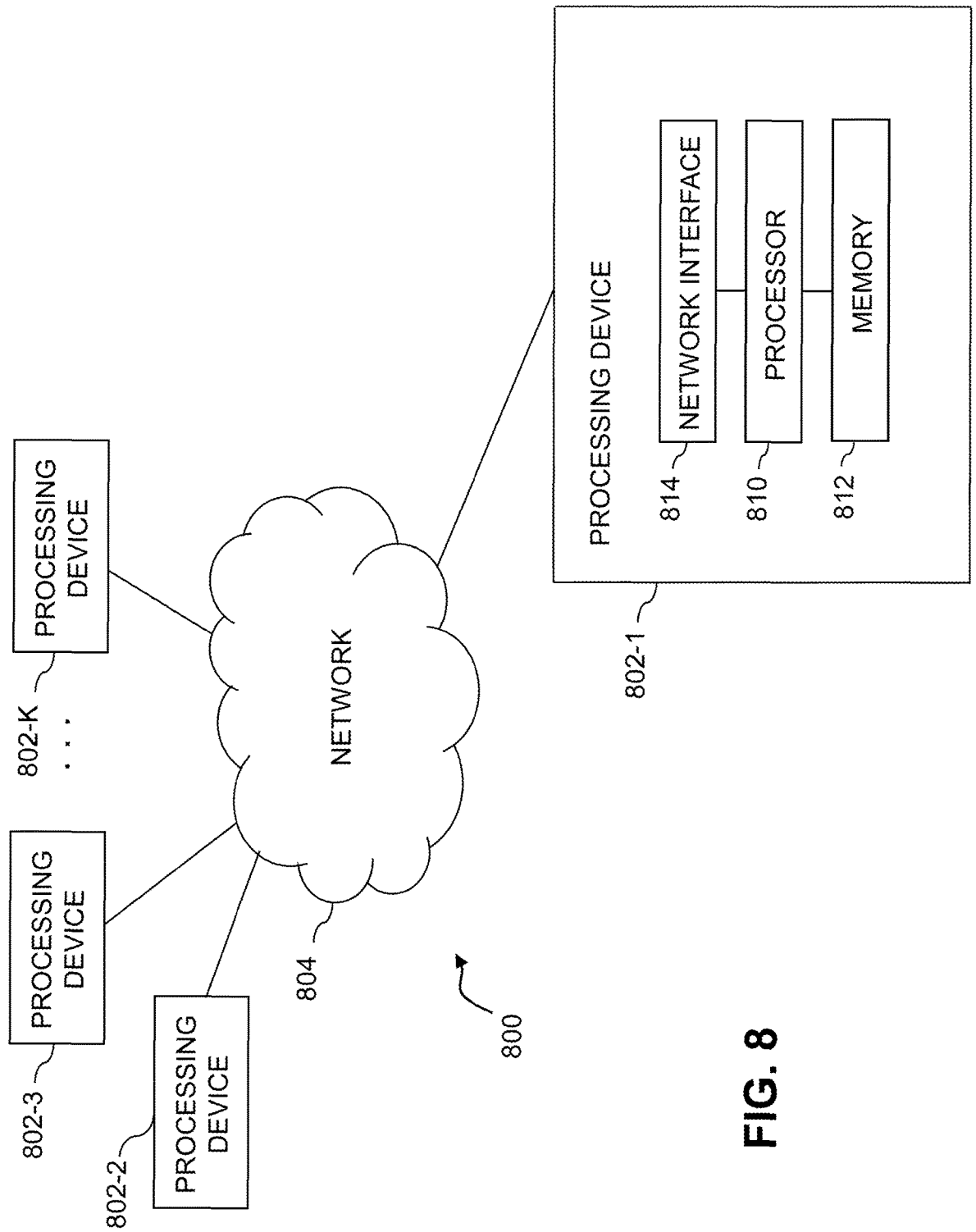

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises virtual machines (VMs) 702-1, 702-2, . . . 702-L implemented using a hypervisor 704. The hypervisor 704 runs on physical infrastructure 705. The cloud infrastructure 700 further comprises sets of applications 710-1, 710-2, . . . 710-L running on respective ones of the virtual machines 702-1, 702-2, . . . 702-L under the control of the hypervisor 704.

Although only a single hypervisor 704 is shown in the embodiment of FIG. 7, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 704 and possibly other portions of the information processing system 100 in one or more embodiments is the VMware® vSphere® which may have an associated virtual infrastructure management system such as the VMware® vCenter™.

The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises a portion of system 100 and includes a plurality of processing devices, denoted 802-1, 802-2, 802-3, . . . 802-K, which communicate with one another over a network 804.

The network 804 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 802-1 in the processing platform 800 comprises a processor 810 coupled to a memory 812.

The processor 810 may comprise a microprocessor, a microcontroller, an application-specific integrated circuit (ASIC), a field-programmable gate array (FPGA) or other type of processing circuitry, as well as portions or combinations of such circuitry elements.

The memory 812 may comprise random access memory (RAM), read-only memory (ROM) or other types of memory, in any combination. The memory 812 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™ or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the storage controllers 108, 408, 428, 508 and 528 of systems 100, 400 and 500 are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, source and target sites, storage systems, storage nodes, storage devices, storage controllers, replication processes, replication engines and associated control logic. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
a first storage system comprising a plurality of storage devices;
the first storage system being configured to participate in a replication process with a second storage system;
the first storage system comprising a replication engine configured:
to request from a data module of the first storage system at least one data page to be replicated to the second storage system as part of the replication process;
responsive to the requested data page being already available in compressed form in the data module, to receive from the data module the requested data page in compressed form with a compressed data indicator and to transmit the requested data page in compressed form to the second storage system along with at least a portion of a content-based signature of the requested data page; and responsive to the requested data page not being already available in compressed form in the data module, to receive from the data module the requested data page in uncompressed form with an uncompressed data indicator and to transmit the requested data page in uncompressed form to the second storage system;

wherein the first storage system comprises a content addressable storage system, the content addressable storage system implementing a mapping between content-based signatures of respective data pages, including the requested data page, and corresponding physical locations of the data pages in the storage devices;

wherein the content-based signature is utilized by the data module of the first storage system to determine the physical location of the requested data page in a particular one of the storage devices;

wherein responsive to the requested data page being already available in compressed form in the data module, the replication engine of the first storage system is further configured to transmit the requested data page in compressed form to the second storage system while bypassing performance of an end-to-end test on the requested data page that would otherwise normally be performed in the first storage system as part of the replication process;

wherein the second storage system responsive to receipt of the requested data page in compressed form from the first storage system is configured to decompress the requested data page and to perform the end-to-end test on the requested data page using the at least a portion of the content-based signature of the requested data page received from the first storage system;

wherein responsive to the requested data page not being already available in compressed form in the data module, the replication engine of the first storage system is further configured to transmit the requested data page in uncompressed form to the second storage system to perform at least a portion of the end-to-end test on the requested data page as part of the replication process;

wherein the end-to-end test comprises comparing a content-based signature of the requested data page generated at the second storage system with the content-based signature of the requested data page generated at the first storage system; and wherein the requested data page is part of a given portion of a site snapshot of the first storage system that is selected for verification in a given cycle of a cycle-based asynchronous replication process, the given portion of the site snapshot comprising a percentage of the site snapshot of the first storage system where a size of the percentage of the site snapshot is selected based at least in part on a number of cycles of the cycle-based asynchronous replication process expected to be executed within a given time period.

2. The apparatus of claim 1 wherein the first and second storage systems comprise respective content addressable storage systems having respective sets of non-volatile memory storage devices.

3. The apparatus of claim 1 wherein the first and second storage systems are associated with respective source and target sites of the replication process and wherein the source site comprises a production site data center and the target site comprises a disaster recovery site data center.

4. The apparatus of claim 1 wherein the content-based signature comprises at least one of a checksum and a hash of content of the requested data page.

5. The apparatus of claim 1 wherein the compressed data indicator comprises a compressed data flag in its set state and the uncompressed data indicator comprises the compressed data flag in its reset state.

6. The apparatus of claim 1 wherein the replication engine comprises replication control logic implemented in a storage controller of the first storage system.

7. The apparatus of claim 1 wherein the decompressing of the requested data page and the performance of the end-to-end test on the requested data page are performed by a replication engine implemented in a storage controller of the second storage system.

8. The apparatus of claim 1 wherein the decompressing of the requested data page and the performance of the end-to-end test on the requested data page are performed by a data module of the second storage system.

9. The apparatus of claim 1 wherein the data module of the first storage system implements a RAID algorithm that compresses data pages in conjunction with storage of the data pages in the storage devices of the first storage system, wherein the data module further comprises at least one cache in which data pages are stored in uncompressed form prior to being compressed for storage in the storage devices, and wherein the requested data page is supplied from the cache of the data module in uncompressed form in response to the request.

10. The apparatus of claim 1 wherein the first storage system comprises a clustered storage system having a plurality of storage nodes each having a plurality of storage devices.

11. A method comprising:

configuring a first storage system comprising a plurality of storage devices to participate in a replication process with a second storage system; and as part of the replication process, a replication engine of the first storage system:

requesting from a data module of the first storage system at least one data page to be replicated to the second storage system;

responsive to the requested data page being already available in compressed form in the data module, receiving from the data module the requested data page in compressed form with a compressed data indicator and transmitting the requested data page in compressed form to the second storage system along with at least a portion of a content-based signature of the requested data page; and responsive to the requested data page not being already available in compressed form in the data module, receiving from the data module the requested data page in uncompressed form with an uncompressed data indicator and transmitting the requested data page in uncompressed form to the second storage system;

wherein the first storage system comprises a content addressable storage system, the content addressable storage system implementing a mapping between content-based signatures of respective data pages, including the requested data page, and corresponding physical locations of the data pages in the storage devices;

wherein the content-based signature is utilized by the data module of the first storage system to determine the physical location of the requested data page in a particular one of the storage devices;

wherein responsive to the requested data page being already available in compressed form in the data module, the replication engine of the first storage system is further configured to transmit the requested data page in compressed form to the second storage system while bypassing performance of an end-to-end test on the requested data page that would otherwise normally be performed in the first storage system as part of the replication process;

wherein the second storage system responsive to receipt of the requested data page in compressed form from the first storage system is configured to decompress the requested data page and to perform the end-to-end test on the requested data page using the at least a portion of the content-based signature of the requested data page received from the first storage system;

wherein responsive to the requested data page not being already available in compressed form in the data module, the replication engine of the first storage system is further configured to transmit the requested data page in uncompressed form to the second storage system and to perform at least a portion of the end-to-end test on the requested data page as part of the replication process;

wherein the end-to-end test comprises comparing a content-based signature of the requested data page generated at the second storage system with the content-based signature of the requested data page generated at the first storage system;

wherein the requested data page is part of a given portion of a site snapshot of the first storage system that is selected for verification in a given cycle of a cycle-based asynchronous replication process performed over a given time period, the given portion of the site snapshot comprising a percentage of the site snapshot of the first storage system where a size of the percentage of the site snapshot is selected based at least in part on a number of cycles of the cycle-based asynchronous replication process expected to be executed within the given time period; and wherein the method is implemented by at least one processing device of the first storage system.

12. A computer program product comprising a non-transitory processor-readable storage medium having stored therein program code of one or more software programs, wherein the program code when executed by at least one processing device of a first storage system comprising a plurality of storage devices causes the first storage system:

to participate in a replication process with a second storage system; and as part of the replication process, a replication engine of the first storage system being configured:

to request from a data module of the first storage system at least one data page to be replicated to the second storage system;

responsive to the requested data page being already available in compressed form in the data module, to receive from the data module the requested data page in compressed form with a compressed data indicator and to transmit the requested data page in compressed form to the second storage system along with at least a portion of a content-based signature of the requested data page; and responsive to the requested data page not being already available in compressed form in the data module, to receive from the data module the requested data page in uncompressed form with an uncompressed data indicator and to transmit the requested data page in uncompressed form to the second storage system;

wherein the first storage system comprises a content addressable storage system, the content addressable storage system implementing a mapping between content-based signatures of respective data pages, including the requested data page, and corresponding physical locations of the data pages in the storage devices;

wherein the content-based signature is utilized by the data module of the first storage system to determine the physical location of the requested data page in a particular one of the storage devices;

wherein responsive to the requested data page being already available in compressed form in the data module, the replication engine of the first storage system is further configured to transmit the requested data page in compressed form to the second storage system while bypassing performance of an end-to-end test on the requested data page that would otherwise normally be performed in the first storage system as part of the replication process;

wherein the second storage system responsive to receipt of the requested data page in compressed form from the first storage system is configured to decompress the requested data page and to perform the end-to-end test on the requested data page using the at least a portion of the content-based signature of the requested data page received from the first storage system;

wherein responsive to the requested data page not being already available in compressed form in the data module, the replication engine of the first storage system is further configured to transmit the requested data page in uncompressed form to the second storage system and to perform at least a portion of the end-to-end test on the requested data page as part of the replication process;

wherein the end-to-end test comprises comparing a content-based signature of the requested data page generated at the second storage system with the content-based signature of the requested data page generated at the first storage system; and wherein the requested data page is part of a given portion of a site snapshot of the first storage system that is selected for verification in a given cycle of a cycle-based asynchronous replication process performed over a given time period, the given portion of the site snapshot comprising a percentage of the site snapshot of the first storage system where a size of the percentage of the site snapshot is selected based at least in part on a number of cycles of the cycle-based asynchronous replication process expected to be executed within the given time period.

13. The method of claim 11 wherein the first and second storage systems comprise respective content addressable storage systems having respective sets of non-volatile memory storage devices.

14. The method of claim 11 wherein the first and second storage systems are associated with respective source and target sites of the replication process and wherein the source site comprises a production site data center and the target site comprises a disaster recovery site data center.

15. The method of claim 11 wherein the content-based signature comprises at least one of a checksum and a hash of content of the requested data page.

16. The method of claim 11 wherein the compressed data indicator comprises a compressed data flag in its set state and the uncompressed data indicator comprises the compressed data flag in its reset state.

17. The computer program product of claim 12 wherein the first and second storage systems comprise respective content addressable storage systems having respective sets of non-volatile memory storage devices.

18. The computer program product of claim 12 wherein the first and second storage systems are associated with respective source and target sites of the replication process and wherein the source site comprises a production site data center and the target site comprises a disaster recovery site data center.

19. The computer program product of claim 12 wherein the content-based signature comprises at least one of a checksum and a hash of content of the requested data page.

20. The apparatus of claim 1 wherein the size of the percentage of the site snapshot is further selected based at least in part on a lag time between initiate of transfer of the given portion of the site snapshot by the first storage system and update of a corresponding site snapshot by the second storage system.

\* \* \* \* \*